United States Patent [19]
Marks

[11] Patent Number: 5,620,073
[45] Date of Patent: Apr. 15, 1997

[54] ROLLERLESS SLIDE SWITCH SELECTABLE RATCHET

[75] Inventor: Joel S. Marks, Los Angeles, Calif.

[73] Assignee: WorkTools, Inc., Chatsworth, Calif.

[21] Appl. No.: 610,846

[22] Filed: Mar. 5, 1996

Related U.S. Application Data

[63] Continuation of Ser. No. 105,125, Aug. 12, 1993.

[51] Int. Cl.$^6$ .................................................. F16D 13/06
[52] U.S. Cl. ......................................... 192/43.2; 192/45.2
[58] Field of Search ........................... 192/43, 43.2, 45.2, 192/41 S, 81 C, 72, 73

[56] References Cited

U.S. PATENT DOCUMENTS

| | | | |
|---|---|---|---|
| 1,565,473 | 12/1925 | Lee | 192/43.2 |
| 1,983,123 | 12/1934 | Dodge . | |
| 2,735,324 | 2/1956 | Goldwater et al. . | |
| 2,762,478 | 9/1956 | Winger . | |
| 2,845,159 | 7/1958 | Stephenson | 192/45.2 |
| 2,870,889 | 1/1959 | Walton . | |
| 3,061,061 | 10/1962 | Browning . | |
| 3,393,780 | 7/1968 | Kilness | 192/43.2 |
| 3,398,612 | 8/1968 | Batten . | |
| 3,783,703 | 1/1974 | Trimble et al. | 192/43.2 X |
| 4,427,100 | 1/1984 | Rude et al. . | |
| 4,485,699 | 12/1984 | Fuller . | |
| 4,497,227 | 2/1985 | Stasiek | 192/43.2 X |
| 4,901,607 | 2/1990 | Beugelsdyk et al. | 192/43.2 X |
| 5,069,091 | 12/1991 | Bramsiepe et al. . | |
| 5,136,901 | 8/1992 | Williams . | |

OTHER PUBLICATIONS

"Designing For Precision: Deep Drawn Metal Stampings," Tran–matic.

Primary Examiner—Andrea L. Pitts
Attorney, Agent, or Firm—Brad I Golstein

[57] ABSTRACT

A reversible, stepless one way clutch mechanism which is suited for use in screwdriver type hand tools according to one embodiment. The improvements comprising: a simplified torque transmitting friction element which is direction selectable by a slide switch, the friction element being a flat plate substantially surrounding, the friction element contacting smooth walls inside of a metal cylinder which is formed from a single thickness metal sheet through a deep drawing process.

17 Claims, 3 Drawing Sheets

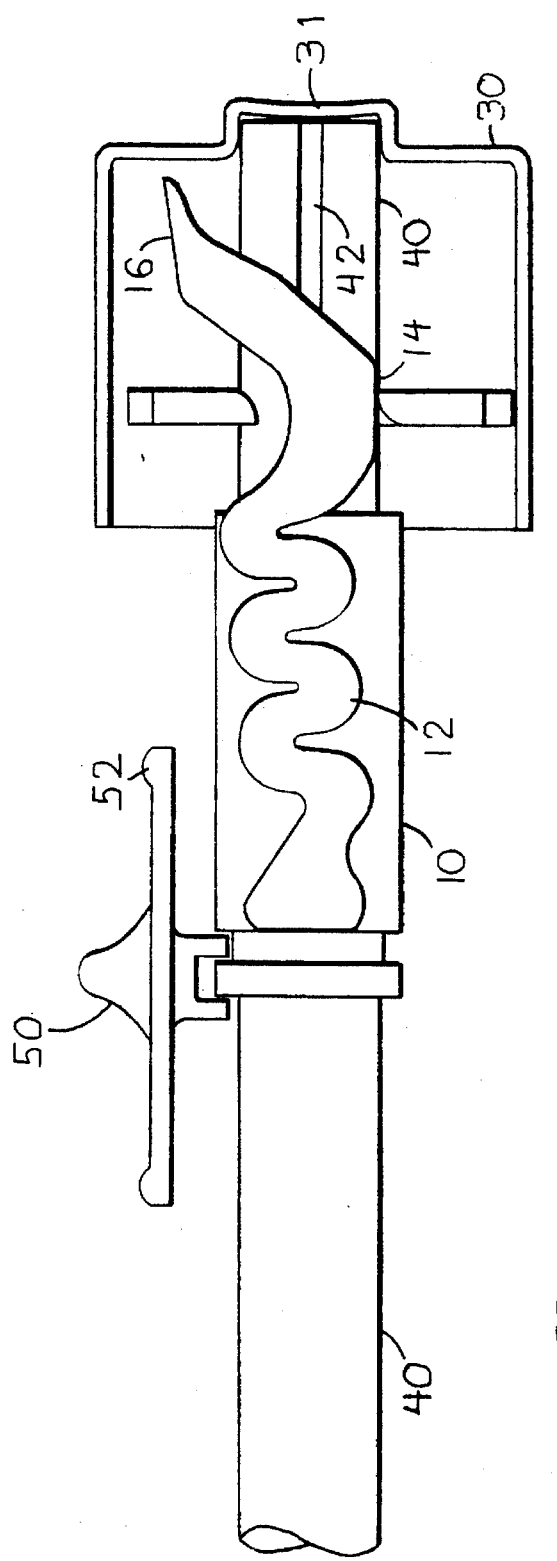
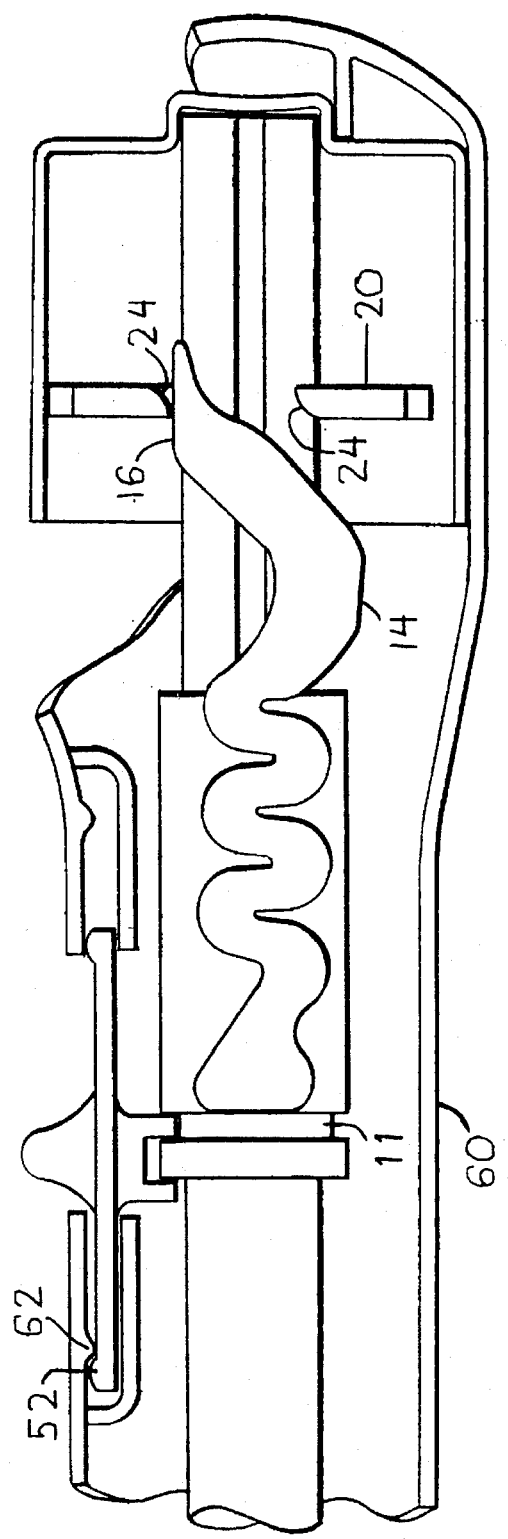

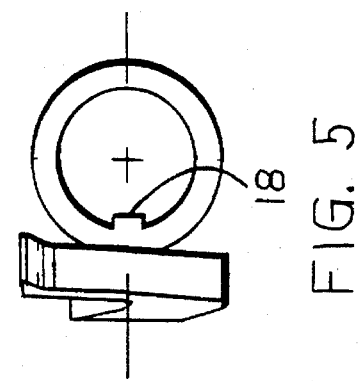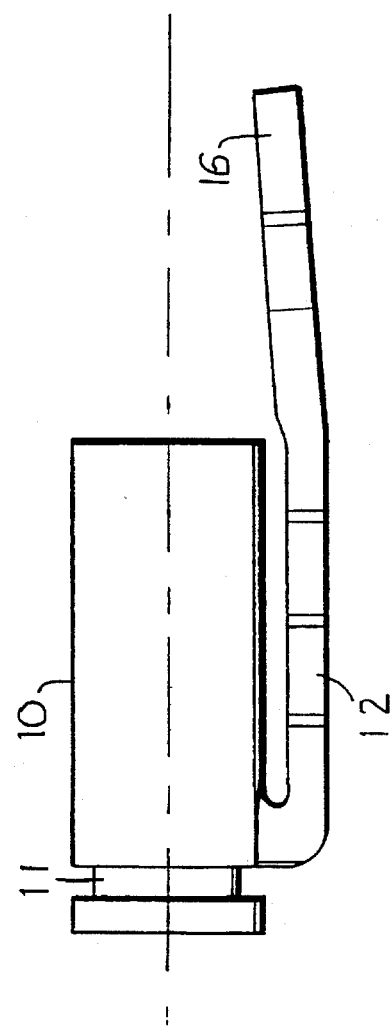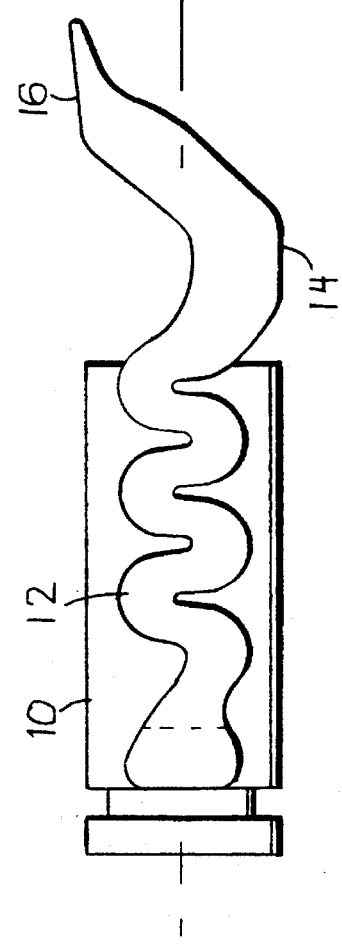

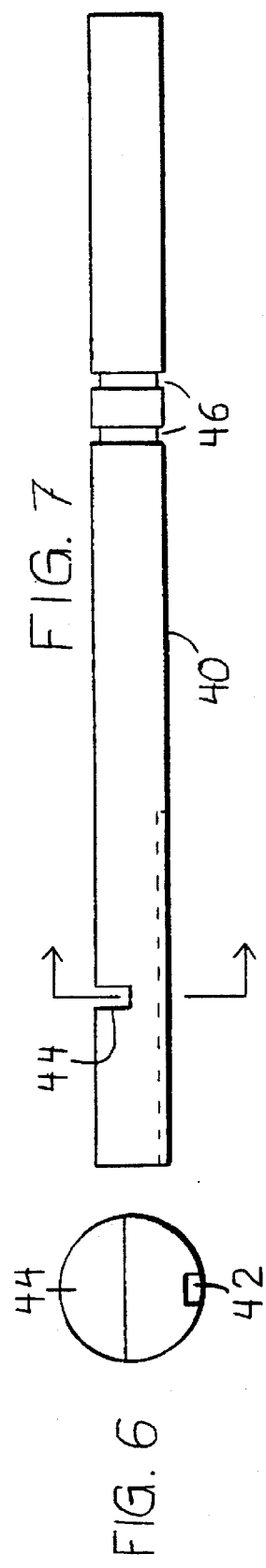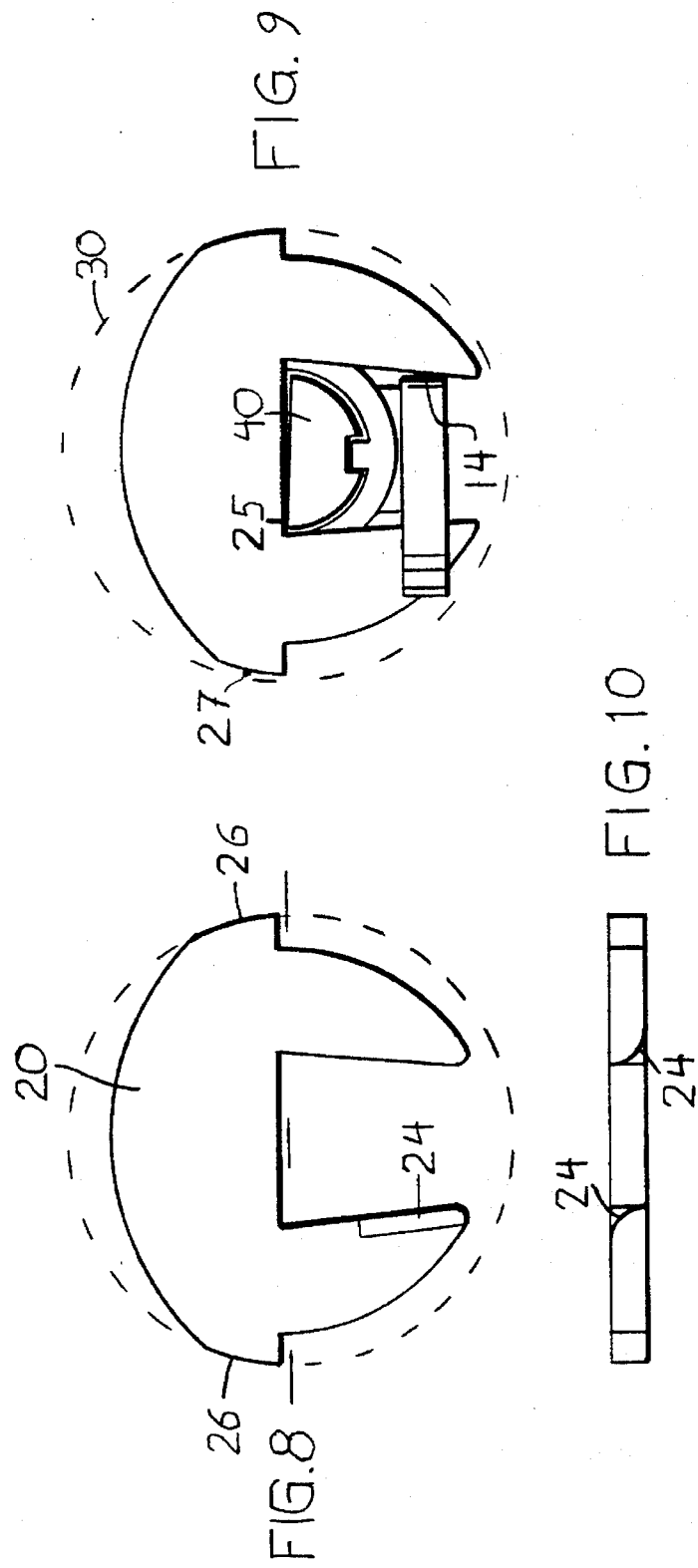

ROLLERLESS SLIDE SWITCH SELECTABLE RATCHET

This application is a continuation of application Ser. No. 08/105,125, filed Aug. 12, 1993.

BACKGROUND OF THE INVENTION

1. Field of the Invention

The present invention generally relates to reversible, stepless, ratchet mechanisms.

2. Description of the Related Art

Various one way clutches are known which use frictional or wedging action to transmit torque. Most common is the use of ball roller bearings in a ramp or cam like assembly. The rollers are pressed between an inner core and an outer cylindrical housing during torque transmission. Negligible friction is present in the torque direction so the wedging action is transformed almost entirely to a radial force between the core and cylinder. Batten U.S. Pat. No. 3,398,612 is a typical example of a wedged roller design. Williams U.S. Pat. No. 5,136,901 shows a reversible wedged roller design. The direction selector rotates substantially around the turning axis of the clutch mechanism.

Fuller U.S. Pat. No. 4,485,699 shows a slide switch selectable wedged roller mechanism. Two oppositely acting roller clutches are separately engagable. Duplicate clutches are required in this design since the clutches cannot be internally reconfigured. Bramsiepe U.S. Pat. No. 5,069,091 employs roller elements and is direction selectable by rotating a cylindrical control element about the driven shaft.

A second clutch design method uses mostly frictional wedging or clamping action. Dodge U.S. Pat. No. 1,983,123 and Goldwater U.S. Pat. No. 2,735,324 employ a single wedgeable braking element. The element presses radially against the rotating core, causing the core to lock against the housing wall.

Rude U.S. Pat. No. 4,427,100 employs a torsion spring clutch. A rotatable control element loads the spring at one end or the other to cause a frictional clamping action.

Browning U.S. Pat. No. 3,061,061 employs a plate wedgeable between a cylindrical housing and a flat sided rotatable core. A spring bias allows the plate to rotate freely in one direction within the cylinder and to become wedged when forced the opposite direction by the flat side of the rotatable core. A selector element rotates about the core element, or driven shaft, to bias the spring in one direction or the other.

Stover U.S. Pat. No. 2,762,478 is similar to U.S. Pat. No. 3,061,061, except that U.S. Pat. No. 2,762,478 uses multiple wedgeable segments.

Walton, U.S. Pat. No. 2,870,889 includes a pair of opposed wedgeable clutch bars.

The present invention is especially intended for screwdriver type tools.

The present invention improves the design of direction selectable stepless clutches with an improved selection means and a simplified, low cost, design.

The controlling element is a slide switch, rather than the usual rotatable collar. A slide switch is most convenient when gripping a screwdriver type handle. A rotating cylinder switch usually requires a second hand to actuate it.

Unlike the slide switch of U.S. Pat. No. 4,485,699, the switch of the present invention acts upon a simple, simplified clutch element.

The clutch mechanism of the present invention improves upon that of U.S. Pat. No. 3,061,061. The wedgeable plate of the present invention is oriented radially rather than axially, relative to the output shaft. The plate can then be manufactured with high speed progressive die equipment to precisely follow the curve of the housing wall where the plate contacts the wall. The angled edges of the plate of U.S. Pat. No. 3,061,061 must be made with less efficient methods.

A further advantage of the present plate design is that it presents edges which may be easily contacted by an axially slidable element. Simple contours on the slidable element selectively press against such edges to provide a selectable spring bias. The slidable element rotates entirely within the tool handle housing. It is accessible from the exterior of the housing through a slide switch. The slide switch links to the slidable element through a circumferencial groove around the rotating element.

Unlike the tools of U.S. Pat. No. 3,051,061 and U.S. Pat. No. 5,069,091, the mechanism of the present invention presents no rotating components outside of the tool housing other than the output shaft. The housing can then have a fixed front bearing component rather than a rotating front bearing sleeve such as 12 in U.S. Pat. No. 3,061,061 or 10 in U.S. Pat. No. 5,069,091. The shaft is therefore more rigidly held within the housing of the present invention.

The present invention uses a deep drawn can, or closed end cylinder, to form the clutch housing wall and rear shaft containment bearing. This is more economical than the machined housing 4 in U.S. Pat. No. 3,061,061, thereby reducing the manufacturing cost. Housing 4 in U.S. Pat. No. 3,061,061 cannot be deep drawn since it has non-constant wall thicknesses between the front and rear portions and a "conically tapered end 7". The shallow closed end of the can of the present invention simplifies deep drawing and provides structural support to the side walls. Deep drawing has the further advantage of providing a high strength work hardened material. The same material cut from solid material must have thicker sections to show equal strength.

OBJECTS AND ADVANTAGES

Several objects and advantages of the present invention are:

to provide a reversible, stepless ratchet with a simplified design and low piece count;

to provide a reversible, stepless ratchet with a slide switch selector means utilizing a simplified clutch element;

to provide a reversible, stepless ratchet comprised of components that may be manufactured by high speed, low cost, methods, such as the use of progressive dies and deep drawing;

to provide a reversible, stepless ratchet that has no rotary components outside of the tool housing except for the output shaft; and to provide a reversible, stepless ratchet mechanism that may be contained in various housings that have a common interior.

Further objects and advantages of the present invention will become apparent from a consideration of the drawings and descriptions.

BRIEF DESCRIPTION OF THE DRAWINGS

FIG. 1 is an elevation, partially in section, of the components of a stepless clutch, with one direction selected.

FIG. 2 is the elevation of FIG. 1, with the opposite direction selected, and showing a partial tool handle housing.

FIG. 3 is a side elevation of a slidable selector element.

FIG. 4 is the element of FIG. 3, rotated 90 degrees on its longitudinal axis.

FIG. 5 is an end view of the element of FIG. 4.

FIG. 6 is a sectional view of an output shaft.

FIG. 7 is an elevation of the shaft of FIG. 6, one half the scale of FIG. 6.

FIG. 8 is an elevation of a controller plate, with a housing element shown in phantom.

FIG. 9 is the view of FIG. 8, with the selector of FIG. 5 and the shaft of FIG. 6 shown in their respective positions.

FIG. 10 is an edge view of the controller of FIG. 8.

DETAILED DESCRIPTION OF THE INVENTION

Housing 60, FIG. 2, contains and guides the functional components. Can 30, FIG. 1, is securely fitted within housing 60. Tabs, not shown, may extend from can 30 to prevent rotation within housing 60. Section 31 of can 30 serves as a back bearing for shaft 40. The can wall at section 31 may be curved inward to provide a low friction pivot for the end of shaft 40. Alternatively, the end of shaft 40 tangent to can 30 may be rounded to serve the same purpose.

Controller 20 straddles notch 44 of shaft 40 within can 30. Edges 26 of controller 20 are cut to closely match the inner circumference of can 30. Rounded edges 24 of controller 20 smoothly engage the sliding surfaces of one piece plastic selector 10. All components of selector 10 are depicted in FIGS. 3–5. Tab 18 fixes selector 10 rotationally along groove 42 of shaft 40. Selector 10 is free to slide along shaft 40. Spring element 12 presses controller 20 through either edge 14 or edge 16. Circumferencial groove 11 links selector 10 to switch 50. Switch 50 can therefore move selector 10 longitudinally while selector 10 remains free to rotate alongside switch 50. Protrusions 52 of switch 50 and 62 of housing 60 engage to secure selector 10 and switch 50 in either a forward or a reverse direction.

Shaft 40 is held at one end by a front bearing component, not shown, of housing 60 so that shaft 40 is radially confined and free to rotate. Shaft 40 thus extends out from the front of housing 60. Circumferencial grooves 46 of shaft 40 engage rib components, not shown, of housing 60 to confine shaft 40 axially.

FIG. 9 corresponds to the position of selector 10 of FIG. 1. Edge 14 is pressing controller 20 to the right in FIG. 9 so that controller 20 contacts shaft 40 within notch 44 at location 25. As shaft 40 rotates slightly further, edge 26 of controller 20 remains in contact with can 30 at the right side of FIG. 9 because of the force from edge 14. Controller 20 rotates slightly about this contact region until the gap between controller 20 and can 30 at location 27 is closed. Controller 20 then fits in can 30 as shown in FIG. 8. Further pressure from the torque upon shaft 40 wedges controller 20 into can 30 so that shaft 40 cannot rotate. Torque is thereby transmitted from can 30 to controller 20, then to shaft 40 through location 25.

When force upon shaft 40 is reversed to counterclockwise in FIG. 9, controller 20 separates slightly from can 30 at location 27. This gap is shown in FIG. 9 for clarity, but actually there is light rubbing contact at location 27, with a minimal gap. As shaft 40 is withdrawn at location 25, controller 20 is free to spin counterclockwise within can 30 by the urging of the spring force from edge 14. The withdrawing motion at location 25 and force from edge 14 combined tend to open the gap at location 27, ensuring that controller 20 remains unwedged. Edge 26 at the right in FIG. 9 can then slide circumferencially within can 30 in response to the circumferencial force from edge 14. The resulting counterclockwise motion of controller 20 limits the gap at location 27 to a rubbing clearance. Hence, there is zero backlash in the mechanism.

A further design option provides a locked condition where controller 20 transmits torque to can 30 in both directions. An element of selector 10 (not shown) engages controller 20 to bias controller 20 upward in FIG. 9. Both edges 26 remain in secure contact with can 30 as shaft 40 rotates in either direction. Some free play is present in the rotation of shaft 40 in this locked condition.

The complete mechanism of the present invention uses only six easily manufactured components in the illustrated embodiment. The components are: molded housing 60; selector 10 and switch 50; deep drawn can 30; stamped controller 20; and automatic machined shaft 40. These parts are all produced economically on high speed equipment and are easily assembled. Switch 50 is exposed within a slot in the side of housing 60, and acts upon selector 10 in a sliding motion. The sliding motion is converted to a rotational bias upon controller 20. In contrast, U.S. Pat. No. 3,061,061 is typical of prior art wherein an annular front bearing ring must be turned to produce an equivalent rotational basis.

The present invention provides a uniquely low cost, rigid and easy to use reversible stepless clutch especially suited for screwdriver type tools. However, elements of the present invention can easily be incorporated into ratchet wrench type designs and other reversible, or non reversible, stepless one way clutch applications. In a further embodiment, a plurality of elements analogous to controller 20 could be used to provide increased strength. Those skilled in the art may now make numerous uses of the teachings of the present invention without departing from the spirit and teachings of the present invention, which are defined solely by the scope of the following claims.

What is claimed is:

1. A reversible stepless one-way clutch assembly comprising:

a molded outer housing body;

a hollow cylinder fitted within said housing body and having a center axis and an inner circumference, drawn from sheet metal, open at a first end and closed at a second end, said first and second ends substantially perpendicular to the axial length of said cylinder;

an elongated metal shaft along said axis and rotatable within said cylinder, one end of said shaft terminating at said second end of said cylinder, said shaft thus extending from said second end through and beyond said first end of said cylinder, said shaft further extending through an orifice of said housing so that said shaft protrudes from said housing;

a molded, tubular, element coaxially around said shaft, said tubular element movable longitudinally along said shaft and fixed rotationally upon said shaft;

a spring member attached at one end to said tubular element and cantilevered toward said second end of said cylinder to form a distal end of the spring member;

said distal end resilient against a force applied perpendicular to the length of said shaft;

a notch across a portion of said shaft between said first and said second ends of said cylinder;

said notch elongated perpendicular to the length of said shaft and of a depth of substantially one-half the diameter of said shaft;

a partially circular metal plate fitted within said notch and partially around said shaft such that said plate is within said cylinder, oriented parallel to said second end of said cylinder;

said distal end of said spring member pressing a first portion of said plate to bias said plate in a first rotational direction around said shaft when said tubular element is in a first position along said shaft;

a further surface of said spring member between said distal end and the attachment location of said spring to said tubular element, said further surface resilient against a force applied perpendicular to the length of said shaft, said further surface pressing said plate at a second portion of said plate when said tubular element is in a second position along said shaft, causing a bias upon said plate in a second rotational direction around said shaft;

said plate becoming wedged between said notch and the inner circumference of said cylinder when said shaft is urged to rotate said second rotational direction and when said tubular element is in said first position, said plate further free to rotate with said shaft within said cylinder when said tubular element remains in said first position and said shaft rotates in said first direction;

said plate becoming wedged between said notch and the inner circumference of said cylinder when said shaft is urged to rotate in said first rotational direction and when said tubular element is in said second position, said plate further free to rotate with said shaft within said cylinder when said tubular element remains in said second position and said shaft rotates in said second direction.

2. The clutch assembly of claim 1 in which said spring member and said tubular element comprise a single piece component.

3. The clutch assembly of claim 1 in which said cantilevered spring member is elongated and includes a segment which comprises an oscillating path.

4. The clutch assembly of claim 1 in which said tubular element includes a circumferencial rib, with said rib engaging a switch component, said switch component slidably fitted within said housing body.

5. The switch component of claim 4 in which said housing body and said switch component have corresponding and engagable protrusions to releasably secure said switch component alternately in a first or a second sliding position.

6. The clutch assembly of claim 1 in which said second end of said cylinder includes an indented or cupped central area to receive said one end of said shaft.

7. An elongated, stepless ratcheting hand driving tool with a reversible one-way clutch comprising:

a housing body having an interior and an exterior;

a metal, internally cylindrical container within said housing body;

a rotatable shaft positioned centrally coaxially within said cylindrical container and extending out from said container and further extending out from said housing body;

a friction element which torsionally and releasably links said shaft to a circumferential, smooth, surface within said cylindrical container, said friction element exerting a radial, outward force, and a rotational torque upon said cylindrical container, said force and said torque being in proportion to increasing torsional input upon said shaft;

said radial force and said rotational torque resulting from a cam or wedge configuration acting upon said friction element between said shaft and said smooth surface within said cylindrical container;

a switch member slideably fitted within said housing body and moveable to distinct positions longitudinally alongside said shaft;

a biasing member moveable longitudinally along said shaft, inked to said switch member and engaging said friction element to cause a bias upon said friction element;

a direction of said bias by said biasing member being selectable by movement to said distinct positions of said switch member, including at least a first bias direction corresponding to a first switch position causing torque to be transmitted between said shaft and said cylindrical container in a first rotational direction only, and a second bias direction corresponding to a second switch position causing torque to be transmitted in a second rotational direction only.

8. The tool of claim 7 in which a third bias direction corresponds to a third switch position and causes torque to be transmitted in both said first and second rotational directions, said third switch position providing a locked condition of said clutch.

9. The tool of claim 7 in which said biasing member has a substantially concentric portion surrounding said shaft and is rotationally fixed upon said shaft.

10. The tool of claim 8 in which a change of said distinct switch positions causes a change in orientation or position of said friction element relative to said shaft.

11. The tool of claim 9 in which said switch member is linked to a circumferencial rib feature of said concentric portion of said biasing member and said switch member is exposed on the exterior of said housing body.

12. The tool of claim 7 in which said shaft is confined by a bearing around a portion of said shaft extending out from said container, said bearing substantially immovable within said housing.

13. The tool of claim 7 in which said shaft has at least one circumferencial groove, and a rib member of said housing body extending into said groove to hold said shaft in position lengthwise.

14. A stepless one way clutch assembly comprising:

a resilient spring member;

a hollow, cylindrical container including a smooth cylindrical internal surface;

a shaft positioned centrally coaxially and rotatably within said container and defining a rotational axis;

a single friction element which torsionally and releasably links said shaft to said internal surface of said cylindrical container;

said spring member pressing said friction element to cause a rotational bias upon said friction element about said rotational axis;

said friction element engaging a flat surface of said shaft, and further engaging said internal surface of said cylindrical container at two distinct locations;

said flat surface of said shaft facing outward from said rotational axis in a first direction;

a second direction being outward from said rotational axis in opposition to said first direction;

said spring member pressing said friction element upon a portion of said friction element located away from said rotational axis in said second direction;

said friction element thereby at least partially surrounding said shaft.

15. The one way clutch assembly of claim 14, in which:

said assembly is contained within a housing;

said shaft extends outward from within said housing through a front bearing element of said housing;

said front bearing is rotationally fixed and rigidly attached to said housing.

16. A stepless, one way clutch assembly comprising:

an outer housing;

a hollow container, with a smooth cylindrical interior, contained within the housing;

a plurality of tabs extending from the container to rotationally engage the container to the housing;

a shaft positioned centrally coaxially within the container, and rotatable within the container;

a friction element which torsionally links the shaft to the interior of the container;

the container, including the tabs, having a substantially constant thickness.

17. The container of claim 16 comprising an open end and a closed end, said shaft held at one end against said closed end and passing through said open end such that said shaft extends out from and beyond said container.

* * * * *